United States Patent Office 3,441,422
Patented Apr. 29, 1969

3,441,422
COATING GLASSES FOR ELECTRICAL DEVICES
William A. Graff, Willoughby, Ohio, assignor to General Electric Company, a corporation of New York
No Drawing. Continuation-in-part of application Ser. No. 491,899, Sept. 30, 1965. This application July 26, 1966, Ser. No. 567,834
Int. Cl. C03c 3/08
U.S. Cl. 106—53    3 Claims This application is a continuation-in-part of my co-pending application Ser. No. 491,899, filed Sept. 30, 1965, now abandoned, and assigned to the assignee of the present application.

The present invention relates to glass compositions for coating electrical devices particularly semiconductive devices, such as diodes and the like.

Diodes including a silicon crystal semiconductor element in the form of a wafer and molybdenum electrical conductors connected to opposite sides of the wafer are known in the art. Miniaturization of such devices has resulted in such reduction in size that encapsulation thereof by glass is feasible.

The principal object of the present invention is to provide glass compositions for use in the arts generally and particularly as an encapsulating coating for semiconductor devices of the above type. Additional objects and advantages of the invention will appear from the following detailed description thereof and from the appended claims.

Encapsulation of semiconductive devices, such as diodes, insures reliability by protecting the diode from mechanical damage and by providing a seal against harmful impurities, such as water vapor, from the atmosphere. Encapsulation also insures stability of electrical characteristics.

In order to serve satisfactorily as an encapsulation coating medium providing the above advantages, the glass must have a coefficient of expansion suitable for hermetically sealing to the various electrical components of the diode, it must wet the surfaces of the electrically conducting parts and must be capable of forming in situ within a temperature range which is harmless to the other components of the diode a protective gas-tight coating. Also, it must not degrade the electrical characteristics of the diode and must be capable of withstanding temperatures existing at the glass-to-metal seals when the diode is soldered to supporting devices.

I have discovered that a glass having the following composition by weight as calculated from a batch satisfies the above requirements.

|  | Percent |
|---|---|
| ZnO | 60 |
| $B_2O_3$ | 25 |
| $SiO_2$ | 9.4 |
| $CeO_2$ | 3 |
| $Bi_2O_3$ | 0.1 |
| PbO | 2 |
| $Sb_2O_3$ | 0.5 |

The glass in the vitreous state has the following properties:

| | |
|---|---|
| Fiber softening point, ° C. | 635 |
| Liquidus temperature, ° C. | 1030 |
| Coefficient of thermal expansion (0–300° C.) | $44.5 \times 10^{-7}/°$ C. |
| Electrical resistivity, log 10 ohm-cm., 350° C. | 11.0 |
| Electrical resistivity, log 10 ohm-cm., 300° C. | 12.0 |
| Electrical resistivity, log 10 ohm-cm., 250° C. | 13.3 |
| Dielectric constant at room temperature and 1 megacycle frequency | 8.1 |
| Dielectric dissipation factor at room temperature and 1 megacycle frequency | .00138 |

The glass is capable of controlled thermal devitrification. Nucleation was found to occur almost exclusively on the free surface of flakes of the glass which indicates that there is no constituent of the glass which acts as an internal nucleating agent. When the glass is in powdered form, nucleation occurs throughout the mass formed when the glass powder is sintered at a temperature of 600° C. for twenty to thirty minutes.

The coefficient of thermal expansion may be changed by suitable heat treatment of the glass in the form of powder. For example, rods 9 inches long, ¼ inch wide and ⅛ inch deep were prepared by filling graphite molds with minus 325 mesh powder of the glass. The glass powder while in the mold was heated in air in an electric furnace to a temperature of 600° C. and held at this temperature for 20 to 30 minutes to sinter the rod into a coherent body. This heat treatment provoked nucleation of the sintered glass. The heat treatment of a plurality of rods was continued without interruption for various times and temperatures as follows to promote crystal growth with the following results on the appearance and the coefficient of thermal expansion.

| Rod No. | Heat Treatment | Appearance | Linear Expansion (0–300° C.) |
|---|---|---|---|
| 1 | 600° C. for 30 min., raised to 650° C. in 10 min., held at 650° C. about 20 minutes. | Vitreous yellow. | $44.9 \times 10^{-7}/°$ C. |
| 2 | 600° C. for 30 min., raised to 700° C. in 15 min., held at 700° C. for 15 minutes. | ....do........ | $42.8 \times 10^{-7}/°$ C. |
| 3 | 600° C. for 30 min., raised to 750° C. in 25 min., held at 750° C. for 5 minutes. | Matte slightly yellow. | $40.6 \times 10^{-7}/°$ C. |
| 4 | 600° C. for 20 min., raised to 650° C. in 10 min., raised to 700° C. in 10 min., raised to 750° C. in 10 min., raised to 800° C. in 10 min. | Matte yellow. | $38.3 \times 10^{-7}/°$ C. |
| 5 | 600° C. for 20 min., raised to 650° C. in 10 min., raised to 700° C. in 10 min., raised to 750° C. in 10 min., raised to 800° C. in 10 min., raised to 850° C. in 20 minutes. | Matte buff colored. | $37.5 \times 10^{-7}/°$ C. |
| 6 | 600° C. for 20 min., raised to 650° C. in 10 min., raised to 700° C. in 10 min., raised to 750° C. in 10 min., raised to 800° C. in 10 min., raised to 850° C. in 10 min., raised to 900° C. in 10 minutes. | Matte slightly buff. | $37.5 \times 10^{-7}/°$C. |

After the heat treatment the filled molds were removed from the furnace and allowed to cool to room temperature in air. The rods were then separated from the molds to determine their coefficient of thermal expansion.

A glass batch suitable for producing glass having the above composition is the following in parts by weight:

| | |
|---|---|
| Zinc oxide | 480.0 |
| Boric acid | 355.2 |
| Silica sand | 75.2 |
| Ceric oxide | 24.0 |
| Bismuth trioxide | 0.8 |
| Lead oxide | 16.0 |
| Antimony trioxide | 4.0 |

The constituents of the batch are thoroughly mixed and then melted by heating the batch to a temperature of 1200° C. under oxidizing conditions in a platinum-rhodium alloy crucible contained in an electric furnace for a time sufficient to form the glass, approximately four hours.

When the glass has become thoroughly melted, it is poured from the crucible and formed into a thin glass ribbon by passing through water-cooled quenching rolls. The quenched glass ribbon discharged from the rolls is collected in a pan. Flakes of the quenched ribbon glass are ball-milled and sized to minus 325 mesh powder.

The glass in powder form, preferably, may be used to form a hermetic coating on the electrically conducting elements of diodes of the above type and the like and the coefficient of thermal expansion of the glass coating may be selected by the heat treatments described above within the range of $37.5 \times 10^{-7}/°$ C. to $44.9 \times 10^{-7}/°$ C. to be compatible with the electrically conducting parts of such diodes.

The coating may be applied in the form of a small bead encapsulating the diode in the known manner or in the form of a thin fillet covering the outer edge surfaces of both the molybdenum and silicon crystal parts of the diode. In either form the glass of the coating wets and makes a hermetic seal with the molybdenum and the silicon crystal parts to provide the diode with the necessary protection from the atmosphere.

The protective coating may be applied to the selected parts of the diode by conventional techniques used in the arts for applying vitreous enamels or glazes to substrates. For example, the powdered glass may be mixed with a conventional organic binder and vehicle to form a suspension or slurry for application to the surfaces of the diode. A solution of 1 to 3 weight percent nitrocellulose in amyl acetate is suitable. The ratio of glass to vehicle and binder when a spray or painting technique is used should be such that the viscosity of the suspension is suitable for providing an adherent coating on the covered parts of the diode while the assembly is heated first to drive off the organic binder and vehicle and then to vitrify the glass powder. Heating the assembly to a temperature within the range of approximately 775° C. to 25° C. for about two to five minutes after the binder and vehicle have been driven off is effective for vitrifying the remaining small quantity of glass powder. In order to prevent oxidation of the molybdenum parts of the diode while subjected to this temperature before the glass powder has vitrified and formed the protective coating, the assembly may be heated in an electric oven in vacuum or in an inert atmosphere, such as nitrogen or a mixture of nitrogen and argon. When a protective coating of devitrified glass is desired the schedule of heat treatment described above may be employed.

Semiconductor devices of the type described above are usually provided with leading-in wires and the encapsulation glass is frequently fusion sealed to part of the leading-in wires. Leading-in wires consisting of or clad with nickel are used extensively in such devices. While bismuth is known to embrittle nickel, the content of bismuth oxide in the encapsulation glass composition disclosed above is sufficiently low that it does not impair the usefulness of the nickel or nickel clad leading-in wires of such devices.

When desired, bismuth oxide may be omitted from the encapsulation glass composition. For example, glass having the following composition in percentage by weight

| | |
|---|---|
| $ZnO$ | 60.0 |
| $B_2O_3$ | 23.0 |
| $SiO_2$ | 10.5 |
| $CeO_2$ | 3.0 |
| $PbO$ | 3.0 |
| $Sb_2O_3$ | 0.5 | as calculated from the batch which consisted of the following in parts by weight

| | |
|---|---|
| Zinc oxide | 60.0 |
| Boric acid | 40.9 |
| Silica | 10.5 |
| $Ce(NO_3)_3 \cdot 6H_2O$ | 7.6 |
| Litharge | 3.0 |
| Antimony trioxide | 0.5 | was melted, powdered, sintered into rods and the rods heat-treated all in the manner described above in connection with the glass containing $Bi_2O_3$. The coefficient of expansion of the heat-treated rods consisting of the $Bi_2O_3$ free glass was found to be as follows.

| Rod No. | Expansion (0–300° C.) |
|---|---|
| 1 | $45.0 \times 10^{-7}/°$ C. |
| 2 | $40.4 \times 10^{-7}/°$ C. |
| 3 | $38.4 \times 10^{-7}/°$ C. |
| 4 | $37.1 \times 10^{-7}/°$ C. |
| 5 | $37.0 \times 10^{-7}/°$ C. |
| 6 | $37.0 \times 10^{-7}/°$ C. |

Such rods of the $Bi_2O_3$ free glass reached a lower expansion coefficient after a lower temperature heat-treatment than did such rods of the glass containing this ingredient. For example, a rod of the $Bi_2O_3$ free glass heated at 600° C. for thirty minutes, raised to 650° C. in ten minutes and held at 650° C. for twenty minutes, raised to 700° C. in ten minutes and held at 700° C. for twenty minutes had a coefficient of expansion of $38.1 \times 10^{-7}/°$ C., whereas a rod of the $Bi_2O_3$ containing glass similarly heat-treated had an expansion coefficient of $43.9 \times 10^{-7}/°$ C. Further, a rod of the $Bi_2O_3$ free glass heated at 600° C. for one hour, raised to 700° C. in ten minutes and held at 700° C. for fifty minutes had a coefficient of expansion of $35.6 \times 10^{-7}°$ C., whereas the rod of $Bi_2O_3$ containing glass similarly heat treated had a coefficient of expansion of $42.1 \times 10^{-7}/°$ C.

The liquidus of the $Bi_2O_3$ free glass was about 1050° C. to 1075° C. Maximum nucleation occurred at about 700° C. to 750° C. and the maximum crystal growth rate occurred at about 800 to 850° C. The coefficient of expansion in the vitreous state was 44.6 to $44.8 \times 10^{-7}/°$ C. The fiber softening point was 637° C. The dielectric constant was 8.3 and the dielectric dissipation factor 0.00145 at room temperature and one megacycle frequency. The electrical resistivity log 10 ohm-cm. at 350° C. was 10.8, at 300° C. was 11.8 and at 250° C. was 13.1.

The $Bi_2O_3$ free glass may be used in place of the $Bi_2O_3$ containing glass for the same purpose and in the same manner as described above.

It is contemplated that the glass of the present invention while eminently satisfactory for encapsulation of semiconductor devices, as described above, may be used in making glass-to-glass and glass-to-metal seals of the type in which devitrifiable sealing glasses having a low coefficient of expansion and a comparatively low softening temperature have been found useful.

The glass when used for encapsulation of semiconductive devices including a silicon crystal element must be free from certain ingredients which tend to interfere with the electrical characteristics of such devices. For example, $TiO_2$ and $ZrO_2$ in the glass tends to cause low voltage breakdown of the device. $CdO$ and too high a concentration of $Sb_2O_3$ may cause low voltage devices as well as causing the voltage to decrease as the operating temperature of the device is increased. The alkalies $Na_2O$, $Li_2O$, $K_2O$ as well as $NiO$, $V_2O_5$, $WO_3$ and $Cu_2O$ present in the glass will cause the device to short out.

What I claim as new and desire to secure by Letters Patent of the United States is:

1. A glass having in the vitreous state a fiber softening point of about 635° C. to about 637° C., a liquidus temperature of about 1030° C. to about 1075° C., a coefficient of expansion of approximately $44.5 \times 10^{-7}/°$ C. to 44.8° C., an electrical resistance of approximately 13.1 to 13.3 log 10 ohm-cm. at 250° C., a dielectric constant of 8.1 and a dielectric dissipation factor of 0.00138 to 0.00145 at room temperature and one megacycle frequency, said glass being capable of thermal devitrification within a period of one hour at a temperature within the range of 750° C. to 850° C. and consisting essentially in weight percent of:

| | |
|---|---|
| ZnO | 60 |
| $B_2O_3$ | 23–25 |
| $SiO_2$ | 9.4–10.5 |
| $CeO_2$ | 3 |
| $Bi_2O_3$ | 0–0.1 |
| PbO | 2–3 |
| $Sb_2O_3$ | 0.5 |

2. A glass according to claim 1 wherein the weight percent of $B_2O_3$ is 25, of $SiO_2$ is 9.4, of $Bi_2O_3$ is 0.1 and of PbO is 2.

3. A glass according to claim 1 wherein the weight percent of $B_2O_3$ is 23, of $SiO_2$ is 10.5, of $Bi_2O_3$ is 0 and of PbO is 3.

References Cited

UNITED STATES PATENTS 3,088,835   5/1963   Pirouz _____ 106—53
3,200,310   8/1965   Carman _____ 106—54

HELEN M. McCARTHY, *Primary Examiner.*

U.S. Cl. X.R.

106—54, 39; 317—234